United States Patent [19]

Keith

[11] Patent Number: 5,349,545
[45] Date of Patent: Sep. 20, 1994

[54] ARITHMETIC LOGIC UNIT DEQUANTIZATION

[75] Inventor: Michael Keith, Holland, Pa.

[73] Assignee: Intel Corporation, Santa Clara, Calif.

[21] Appl. No.: 981,322

[22] Filed: Nov. 24, 1992

[51] Int. Cl.$^5$ .............................................. G06K 9/36
[52] U.S. Cl. ................................ 364/715.02; 382/56
[58] Field of Search ........................ 364/715.02, 745; 382/56, 50

[56] References Cited

U.S. PATENT DOCUMENTS

| | | | |
|---|---|---|---|
| 4,698,689 | 10/1987 | Tzou | 382/56 |
| 4,807,298 | 2/1989 | Conte et al. | 382/56 |
| 5,054,103 | 10/1991 | Yasuda et al. | 382/56 |

Primary Examiner—David H. Malzahn
Attorney, Agent, or Firm—William H. Murray; James H. Dautremont

[57] ABSTRACT

A device for dequantizing signals is provided in which two hardware operations are generated. The first hardware operation generates a signal representative of a binary function $s(a,b)$ wherein the input signal b is shifted, incremented and decremented to provide signals $2b+1$, $2b$ and $2b-1$. A selector selects the first of these signals when a is positive, the second when a is zero, and the third when a is negative. The second signal generated is representative of a unary function $t(c)$. In this function signal c is incremented and decremented to provide signals $c-1$, c and $c+1$. A selector selects the first of these signals when c is positive, the second when c is zero, and the third when c is negative. The selected signal in the unary operation is applied to a further selector which also receives signal c as an input. One of the two signals applied to the further selector is selected according to whether signal c is odd or even. Signals $s(a,b)$ and $t(c)$ are then combined by applying the signal $s(a,b)$ to the c input of $t(c)$ to implement the conventional dequantization formula $d = Q*(2*v + \text{sign}(v))$ if d is even $d = d - \text{sign}(d)$.

12 Claims, 2 Drawing Sheets

ARITHMETIC LOGIC UNIT DEQUANTIZATION

BACKGROUND OF THE INVENTION (1) Field of the Invention

This invention relates to signal processing and in particular to dequantization of signals.

(2) Background Art

The process of quantization is understood broadly to include any process wherein a signal is divided by a quantization value in order to reduce the number of bits required to encode the signal. This is understood to cause the loss of a known amount of precision in order to achieve the reduction. It is well known to perform quantizing and dequantization operations in the field of compression and decompression of video and graphics signals. In the dequantization operation a quantized signal v is transformed into a dequantized signal d by a corresponding inverse operation.

In the field of video data processing it is known to perform dequantization using a quantization scaling factor Q as follows:

$$d = Q*(2*v + sign(v)) \text{ if } (d \text{ is even}) d = d\text{-}sign(d) \quad \text{Equations (1)}$$

Unfortunately, the implementation of the dequantization operation of Equations (1) in software is fairly complex and computationally intensive. If this dequantization operation is performed by a processor it can not be performed with fewer than sixteen processor cycles in the prior art.

When performing a transform from a spatial domain representation of a video image to a frequency domain representation, the dequantization operation of Equations (1) must be performed once for every non-zero discrete cosine transform coefficient. In many typical video processing applications this may amount to performing these computationally intensive dequantization operations approximately once every sixteen pixels. Thus it would be advantageous to optimize the performance of this dequantization operation.

SUMMARY OF THE INVENTION

A device for dequantizing signals is provided in which two hardware operations are generated. The first hardware operation generates a signal representative of a binary function s(a,b) wherein the input signal b is shifted, incremented and decremented to provide signals $2b+1$, $2b$ and $2b-1$. A selector selects the first of these signals when a is positive, the second when a is zero, and the third when a is negative. The second signal generated is representative of a unary function t(c). In this function signal c is incremented and decremented to provide signals $c-1$, c and $c+1$. A selector selects the first of these signals when c is positive, the second when c is zero, and the third when c is negative. The selected signal in the unary operation is applied to a further selector which also receives signal c as an input. One of the two signals applied to the further selector is selected according to whether signal c is odd or even. Signals s(a,b) and t(c) are then combined by applying the signal s(a,b) to the c input of t(c) to implement the conventional dequantization formula $d = Q*(2*v + sign(v))$, if d is even) $d = d\text{-}sign(d)$.

DETAILED DESCRIPTION OF THE INVENTION

Figure 1:
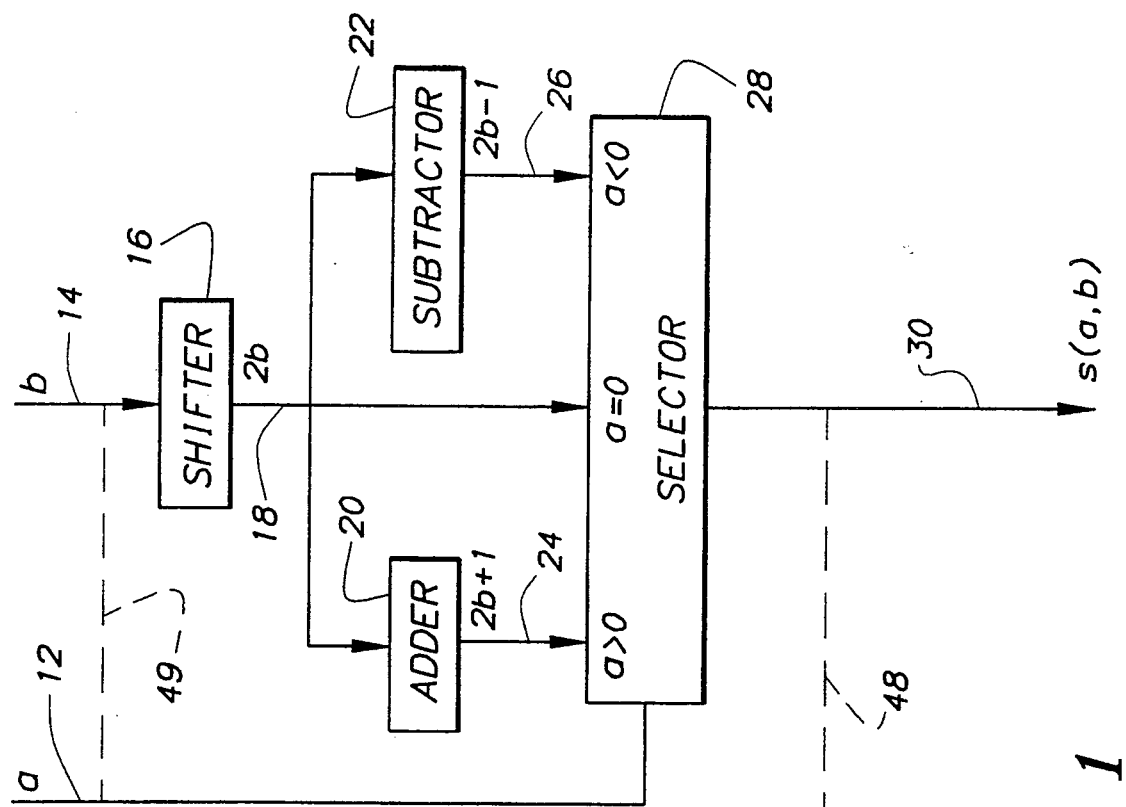
FIG. 1 shows a hardware representation of the arithmetic logic unit dequantization circuit of the present invention.
Figure 1:
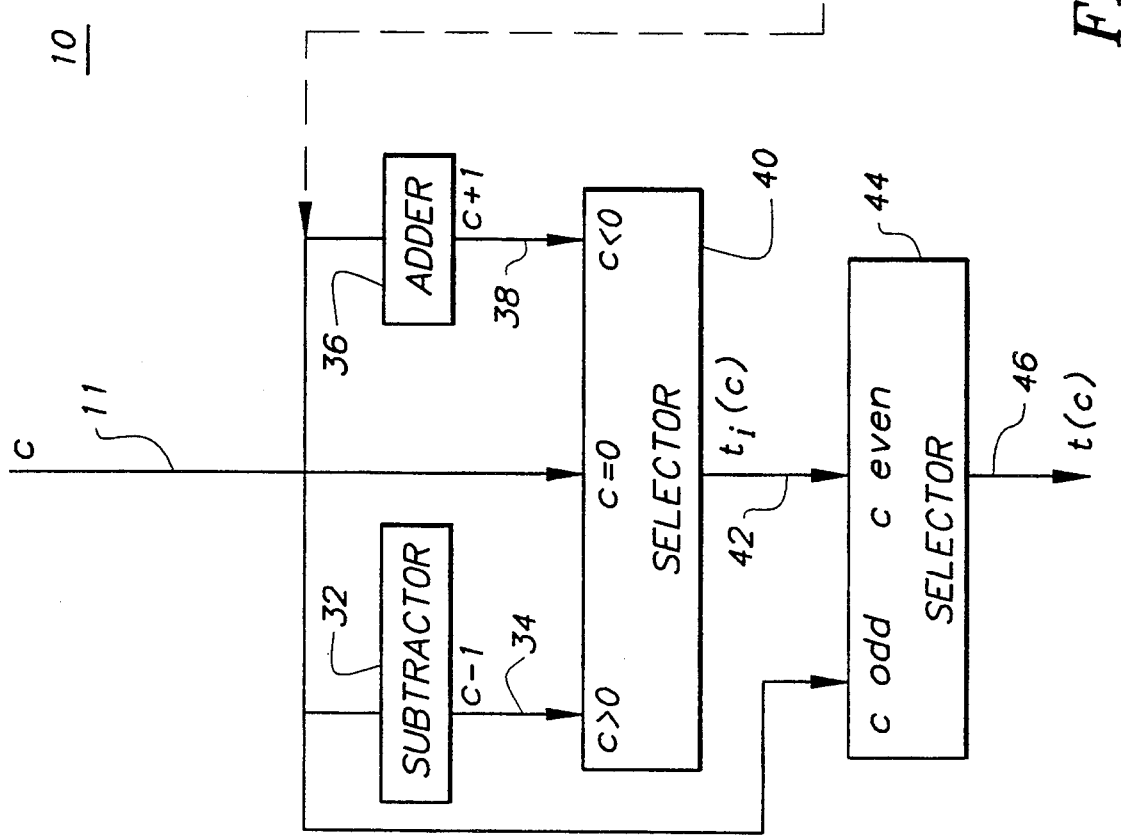

Referring now to FIG. 1, there is shown arithmetic logic unit dequantization circuit 10 of the present invention. Within arithmetic logic unit dequantization circuit 10 at least two signals are formed: s(a,b) and t(c). Within arithemtic logic unit dequantization circuit 10, the signal s(a,b) may be applied to the input of t(c) by making c=s(a,b) to implement the conventional dequantization formula of Equations (1).

Signal s(a,b) represents a binary function which receives two dequantization input signals, a and b. The dequantization input signals a and b of signal s(a,b) may be applied to dequantization circuit 10 by way of dequantization input lines 12, 14 for processing to form signal s(a,b) on selector output line 30.

Signal t(c) represents a unary function having a single input signal c. Signal c may be applied to dequantization circuit 10 by way of dequantization input line 11. Alternately the signal s(a,b) may be applied to the input of t(c) by way of input line 48 represented as dotted line 48. Signal t(c) may be provided at selector output line 46. Thus dequantization circuit 10 is a signal processing device for processing input signals a and b to provide a plurality of intermediate signals and output signals. In particular, dequantization circuit 10 may provide the dequantized value d of Equations (1) when signal s(a,b) is applied to the input line 11 of the circuitry implementing the function t(c) by way of line 48.

Input signal b, applied to dequantization circuit 10 by way of dequantization input line 14, is shifted left one bit position by shifter device 16. It will be understood by those skilled in the art that shifter device 16 may be any device, such as a conventional shift register, which is effective to shift input signal b as required. The one bit shift by shifter device 16 effectively multiplies input signal b on dequantization input line 14 by the factor two and provides signal $2b$ on selector input line 18.

Signal $2b$ on selector input line 18 is applied to one-of-three selector circuit 28 by selector input line 18. It will be understood by those skilled in the art that one-of-three selector circuit 28 may be any conventional selector device which is effective to select one of three selector input signals applied to selector circuit 28 by way of selector input lines 18, 24 and 26, and gate the selected input signal from the selector input line 18, 24 and 26 to selector output line 30. This selection is performed by selector device 28 in accordance with input signal a within dequantization circuit 10 of the present invention.

Signal $2b$ from shifter device 16 is also applied by way of selector input line 18 to addition device 20 of dequantization circuit 10. A conventional signal processor device for adding signals, of the types well known to those skilled in the art may be used as addition device 28 within dequantization circuit 10. Addition block 20 applies a signal representative of the value one to signal $2b$ of selector input line 18 in order to provide signal $2b+1$ on selector input line 24. Selector input line 24 applies signal $2b+1$ to selector 28.

Signal 2b from shifter device 16 is also applied by way of selector input line 18 to subtraction device 22. Subtraction device 22 may be a conventional circuit suitable for subtracting one from signal 2b on selector input line 18 to provide signal 2b−1. Signal 2b−1 is then applied to selector input line 26 by subtraction device 22. It will also be understood that subtraction device 22 may be a conventional addition device which applies a signal representative of the value negative one to signal 2b.

Thus, signals 2b+1, 2b and 2b−1 are applied to one-of-three selector circuit 28 by way of selector input lines 24, 18 and 26 respectively within dequantization circuit 10. In order to select one of these three input signals, signal a is applied to selection device 26 by way of dequantization input line 12. If signal a as applied by input line 12 is greater than zero, selector circuit 28, or selector device 28, applies signal 2b+1, received by way of selector input line 24, to selector output line 30. If input signal a is zero, as determined by selector device 28, selector device 28 applies signal 2b, received by way of selector input line 18, to selector output line 30. If input signal a is less than zero, selector device 28 applies signal 2b−1, received by way of selector input line 26, to selector output line 30.

Thus signal s(a,b) is formed within arithmetic logic unit dequantization circuit 10 by processing dequantization input signals a and b and is provided on selector output line 30 as previously described. It will be understood by those skilled in the art that signal s(a,b) provided at selector output line 30 of dequantization device 10 in this manner may be represented as:

$$
\begin{aligned}
s(a, b): & \quad \text{Equations (2)}\\
a > 0: & \quad 2b + 1 \\
a = 0: & \quad 2b \\
a < 0: & \quad 2b - 1
\end{aligned}
$$

Simultaneously with the forming of signal s(a,b), signal t(c) may be formed within dequantization circuit 10. Signal t(c) is formed within dequantization circuit 10 by processing input signal c and it is provided on selector output line 46 of one-of-two selector circuit 44. As previously described, signal t(c) represents a unary function of a single dequantization input signal, c, only. Input signal c is applied to one-of-three selector circuit 40 by way of dequantization input line 11. One-of-three selector circuit 40 receives two other input signals. These two additional signals are received by way of selector input lines 34, 38. A selected one of the three input signals of selector circuit 40 is applied to selector output line 42 in accordance with dequantization input signal c in a manner well understood by those skilled in the art.

Input signal c is also applied by way of dequantization input line 11 to subtraction device 32 within dequantization circuit 10 of the present invention. Subtraction device 32 may be any conventional circuit suitable for subtracting a signal representative of one from input signal c. The subtraction of this signal provides signal c−1 on selector input line 34 of one-of-three selector circuit 40. Additionally, subtraction circuit 32 may be a signal processor device for applying a signal representative of the value negative one to input signal c.

Input signal c is also applied by way of dequantization input line 11 to conventional addition device 36 which adds a signal representative of the value one to input signal c in order to provide signal c+1 on selector input line 38. Selector input line 38 applies signal c+1 to selector device 40. Addition device 36 of dequantization circuit 10 may also be a conventional signal processing device.

Thus one-of-three selector device 40 receives signals c−1, c and c+1 by way of selector input lines 34, 11 and 38 respectively. If input signal c is greater than zero, as determined by selector device 40, signal c−1, received by way of selector input line 34, is applied to selector output line 42. If input signal c is equal to zero then signal c, received by way of input line 11, is applied to selector output line 42. If one-of-three selector device 40 determines that input signal c is less than zero signal c+1, received by way of selector input line 38, is applied by selector device 40 to selector output line 42.

Thus intermediate signal $t_i(c)$ of selector output line 42 of one-of-three selector 40 within dequantization circuit 10 may be represented as:

$$
\begin{aligned}
t_i(c): & \\
c > 0: & \quad c - 1 \\
c = 0: & \quad c \\
c < 0: & \quad c + 1
\end{aligned}
$$

Intermediate signal $t_i(c)$ of selector output line 42 is applied to an input of one-of-two selector device 44 within dequantization circuit 10 of the present invention. Additionally, dequantization input signal c is applied to the input of one-of-two selector device 44 by way of dequantization input line 11. One-of-two selector device 44 thus receives two inputs, one by way of dequantization input line 11 and the other by way of selector output line 42. The input received by way of line 42 is the signal c−1, c or c+1 as determined by selector device 40 in accordance with dequantization input signal c.

One-of-two selector device 44 selects one of the two inputs on lines 11, 42 and applies the selected input to selector output line 46. The signal which is applied to selector device 44 by way of line 42 is determined by selector device 40 as previously described. If input signal c is determined by selector device 44 to be even, the signal applied to selector device 44 by way of line 42 is selected. If selector device 44 determines that input signal c is odd the signal of dequantization input line 11 is selected and applied to selector output line 46.

Thus signal t(c), provided at selector output line 46 of one-of-two selector 44 of dequantization device 10, may be represented as:

$$
\begin{array}{lll}
t(c): & c \text{ even} \quad c \text{ odd} & \text{Equations (3)}\\
c > 0: & c - 1 \qquad c \\
c = 0: & c \qquad\quad\; c \\
c < 0: & c + 1 \qquad c
\end{array}
$$

Thus, in order to perform the dequantization of the present invention, two hardware operations are provided. These hardware operations are adapted to generate the signals s(a,b) and t(c). It will be understood by those skilled in the art that these two operations may be implemented on dedicated hardware circuitry.

Alternately, conventional signal processing instruments may be used to process signals a, b and c to generate signals s(a,b) and t(c) as also previously described. It will also be understood that the functions of dequantization device 10 may be performed in accordance with software adapted to cause a data processor device to perform the operations required to generate s(a, b) and t (c).

Figure 2:
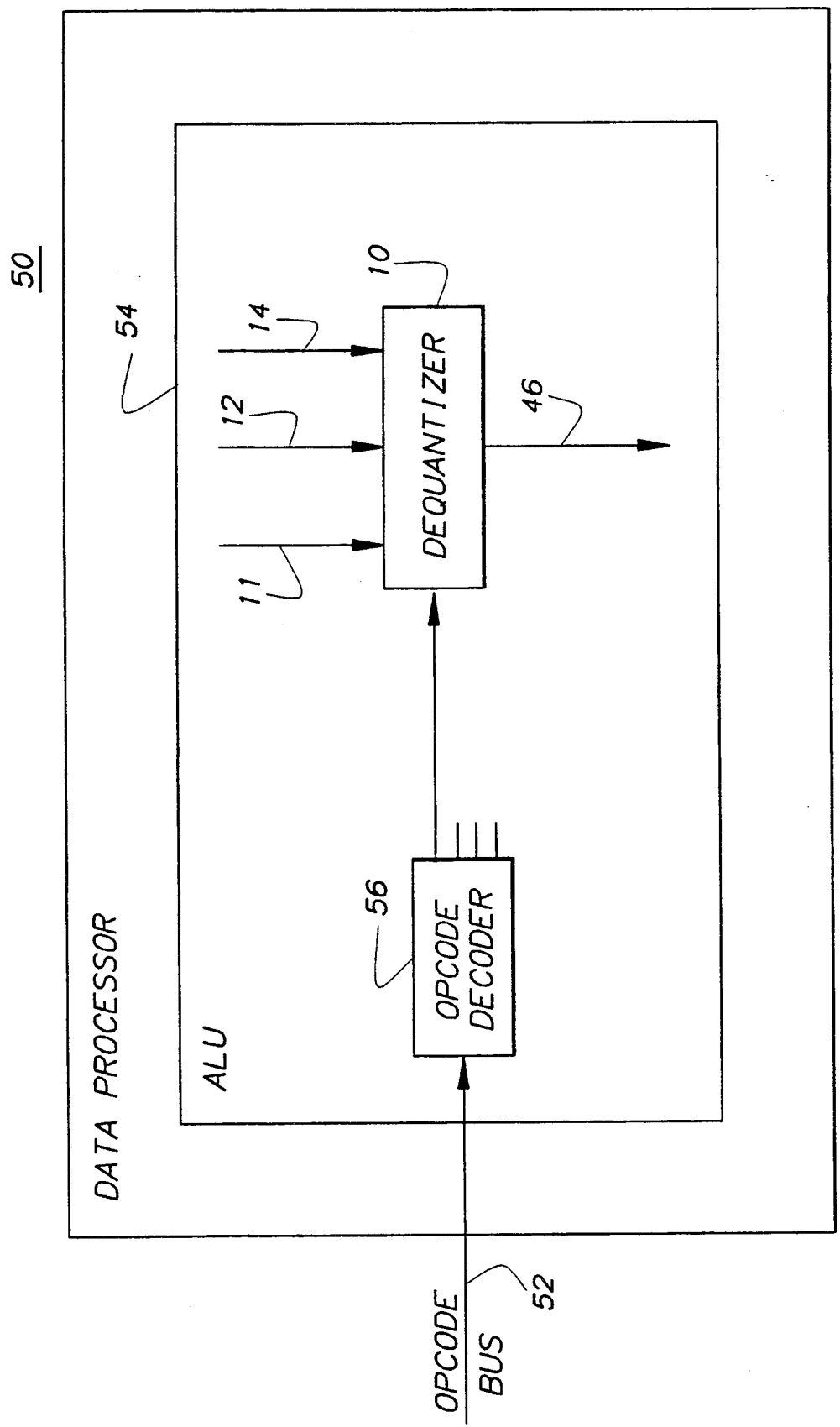
FIG. 2 shows a block diagram representation of a processor containing the circuit of FIG. 1.

Referring now to FIG. 2, there is shown data processor device 50. Data processor device 59 is adapted to perform the operations required to generate signals representative of s(a,b) and t(c) as set forth in arithmetic logic unit dequantization circuit 10. It will be understood that arithmetic logic unit 54 of data processor device 50 may be provided with microcode within data processor device 50 suitable to cause the processor device 50 to perform these operations in response to predetermined syntax.

In data processor device 54 the binary function s(a,b) and the unary function t(c) may be performed independently in response to separate predetermined opcodes applied to opcode decoder 56 by way of opcode bus 52. Alternately, both of these operations may be performed in response to a single predetermined opcode in response to which the microcode of data processor 50 applies selector output line 30 to input line 11. Microcode for performing the operations of arithmetic logic unit dequantizer circuit 10 within data processor 50 may be formed of integrated circuit transistor elements in the manner understood by those skilled in the art.

It will be understood by those skilled in the art that Equations (2) and Equations (3), representing signals s(a,b) and t(c) within dequantization circuit 10, may be rewritten as:

$$s(a, b) = 2b + \text{sign}(a) \quad \text{Equation (4)}$$

and $$t(c) = \text{if}(c \text{ is even})c \pm \text{sign}(c) \quad \text{Equation (5)}$$
$$= \text{if}(c \text{ is odd})c$$

It will be understood that the same input signal may be applied to both inputs 12, 14, and that the single input may be a quantized value v. This input is represented as dotted line 49 of circuit 10. Substituting a=b=v into Equation (4) provides:

$$s(v,v) = 2v + \text{sign}(v). \quad \text{Equation (6)}$$

With respect to Equations (1) it will be understood by those skilled in the art that substituting a new quantization factor Q for the quantization factor Q is permitted in order to remove the factor of two within the parenthesis. This is permitted provided that it is understood that the substitution must be compensated for elsewhere. Making that substitution for in Equations (1) provides;

$$Q^*(2^*v + \text{sign}(v)) = s(v,v) \quad \text{Equation (7)}$$

Substituting Equations (6) and (7) into Equations (1) now provides d=s(v,v) if d is even) d=d-sign(d). Substituting Q,*s(v,v) into Equation (5) then provides:

$$d = t(Q^*s(v,v)) \quad \text{Equation (8)}$$

The operations of Equation (8) which perform the dequantization method of the present invention, and are embodied in dequantization circuit 10 of arithmetic logic unit 54, may be performed within four machine cycles on a conventional video processing device such as processor device 50. It is believed that the fastest prior art methods of implementing Equations (1) required at least sixteen machine cycles.

It should be understood that the foregoing description and drawings of the invention are not intended to be limiting, but are only exemplary of the inventive features which are defined in the claims.

I claim:

1. A device for dequantization of signals, said device having inputs for receiving at least first and second input signals, comprising:
    a first shifter for shifting said second input signal to provide a third shifter signal;
    a first addition device for adding a fourth signal to said third shifted signal to provide a first added signal;
    a second addition device for adding a fifth signal to said third shifted signal to provide a second added signal; and,
    first selector means for receiving said third shifted signal and said first added signal and said second added signal and for applying a selected one of said third shifted or first added or second added signals to a first selector means output in accordance with said first input signal.

2. The device for dequantization of signals of claim 1, wherein said first addition device adds a signal representative of the value one to provide a first added signal equal to said third shifted signal plus one.

3. The device for dequantization of signals of claim 1, wherein said second addition device adds a signal representative of the value negative one to provide a second added signal equal to said third shifted signal minus one.

4. The device for dequantization of signals of claim 1, wherein said first shifter means comprises means for shifting said first input signal left.

5. The device for dequantization of signals of claim 1, wherein said first selector means further comprises means for selecting in accordance with the magnitude and sign of said first input signal.

6. The device for dequantization of signals of claim 5, wherein said first selector means further comprises:
    means for selecting said first added signal when said first input signal is positive;
    means for selecting said third shifted signal when said first input signal is zero; and,
    means for selecting said second added signal when said first input signal is negative.

7. The device for dequantization of signals of claim 1, wherein said first and second input signals are represented by a and b respectively and the signal of said first selector means output is represented by:

$$S(a, b) = \begin{array}{l} a > 0: 2b + 1 \\ a = 0: 2b \\ a < 0: 2b - 1. \end{array}$$

8. The device for dequantization of signals of claim 7, wherein said first shifter, said first addition device said second addition device and said first selector means are disposed on an integrated circuit processor device.

9. The device for dequantization of signals of claim 1, said device having a third input signal, further comprising:
    a third addition device for adding a sixth signal to said third input signal to provide a third added signal;

a fourth addition device for adding a seventh signal to said third input signal to provide a fourth added signal;

second selector means for receiving said third input signal and said third and fourth added signals and applying a selected one of said second received signals to a second selector means output in accordance with the magnitude and sign of said third input signal; and, third selector means for receiving said third input signal and said second selector output signal and applying a selected one of said third received signals to a third selector means output in accordance with whether said third input signal is even or odd.

10. The device for dequantization of signals of claim 9, wherein said third input signal is represented as c and the signal of said second selector means output is represented by:

$$\begin{array}{lll} t(c) = & c\text{-even} & c \text{ odd} \\ c > 0: & c - 1 & c \\ c = 0: & c & c \\ c < 0: & c = 1 & c \end{array}$$

11. The device of claim 9, wherein said third input signal is the signal from said first selector means output.

12. The device of claim 1, wherein said first and second input signals are equal.

* * * * *